Feb. 6, 1968  V. H. CLAUSEN ETAL  3,367,823
AUTOMATIC PLYWOOD LAYUP APPARATUS AND METHOD
Filed Aug. 5, 1963  4 Sheets-Sheet 1
FIG—1
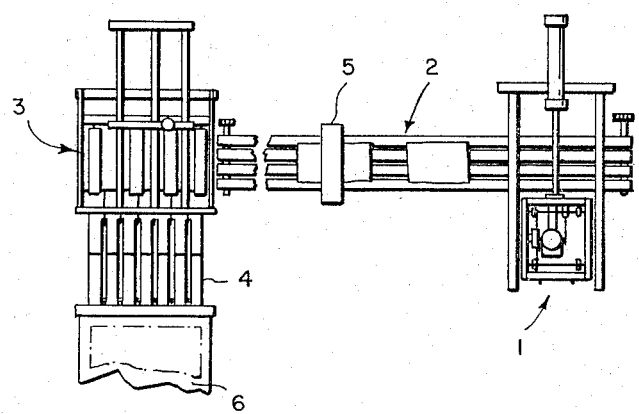
FIG—2
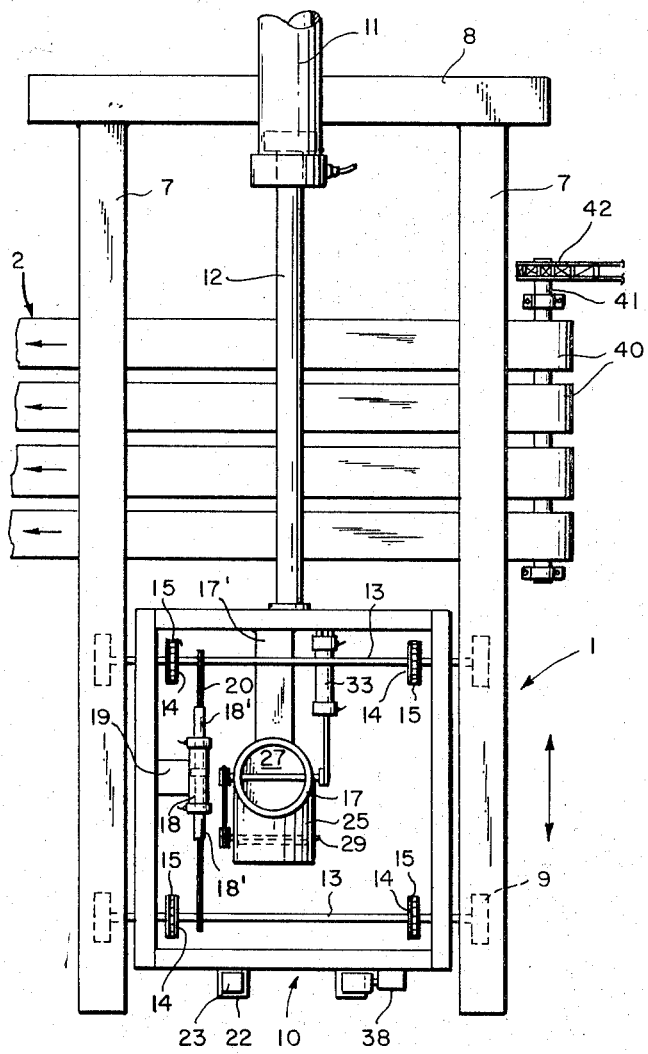
VICTOR H. CLAUSEN
ARNOLD ZWEIG
INVENTORS
BY Seed Berry
ATTORNEYS

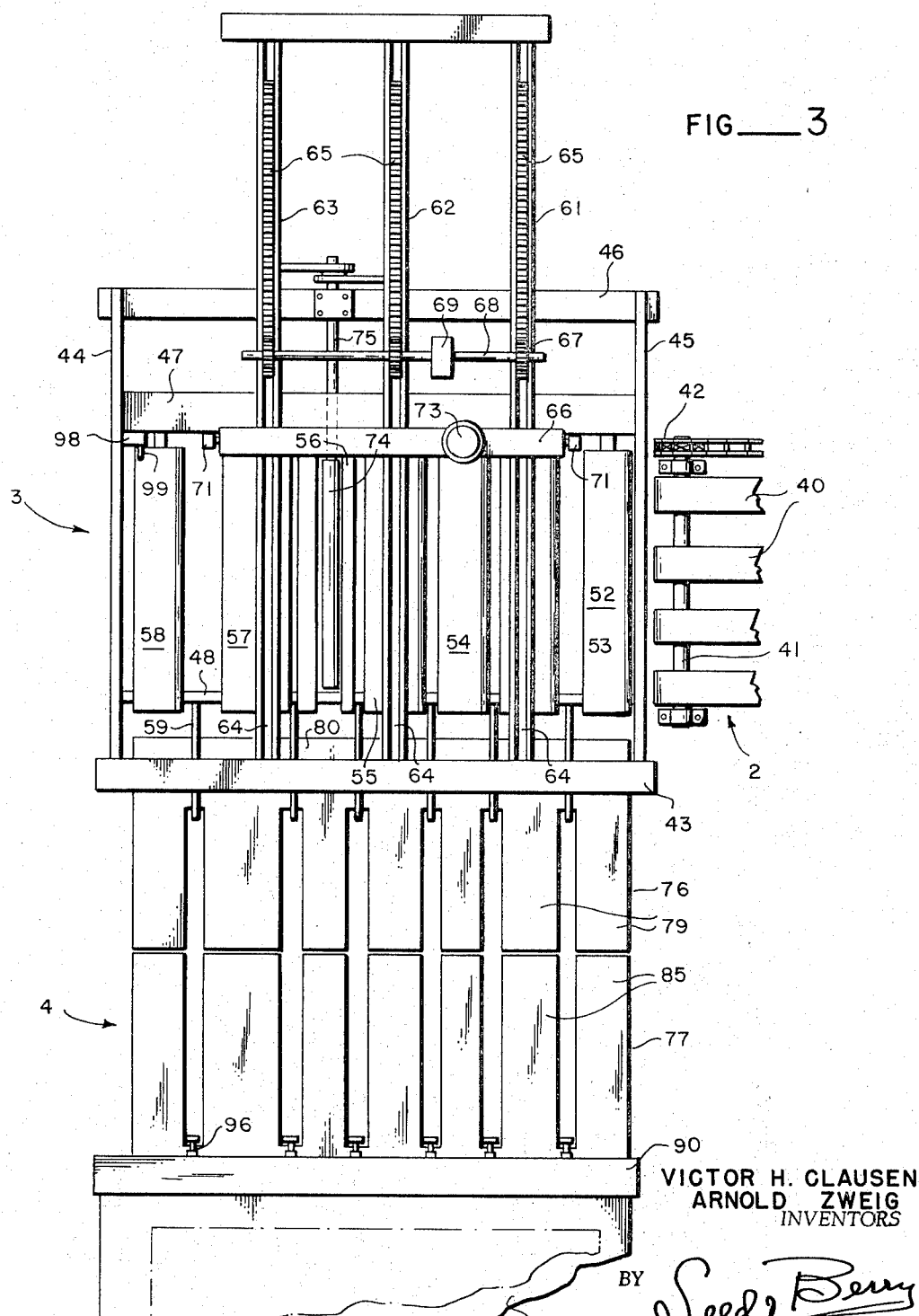
FIG__3

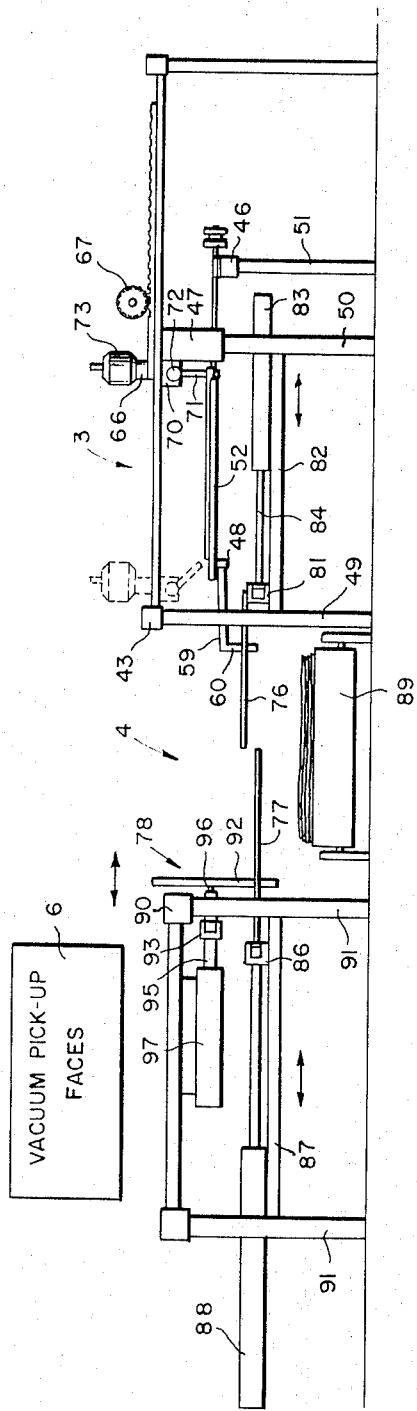

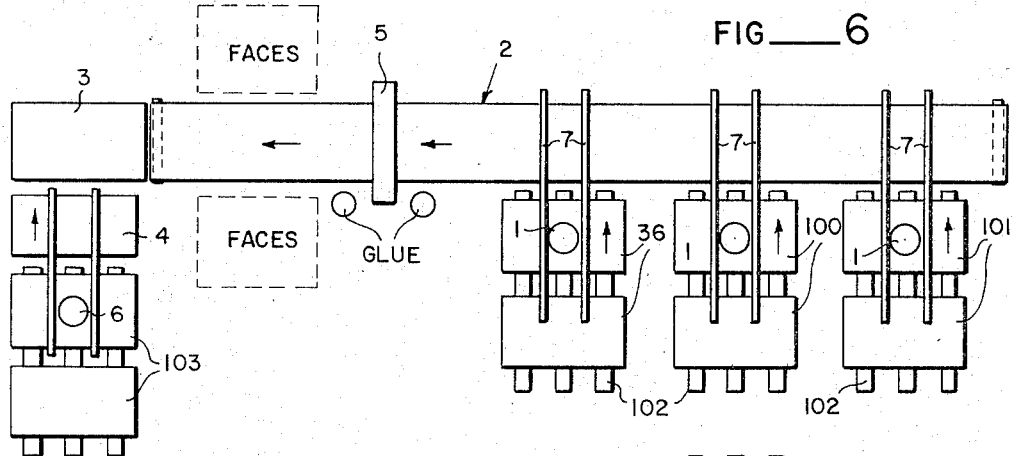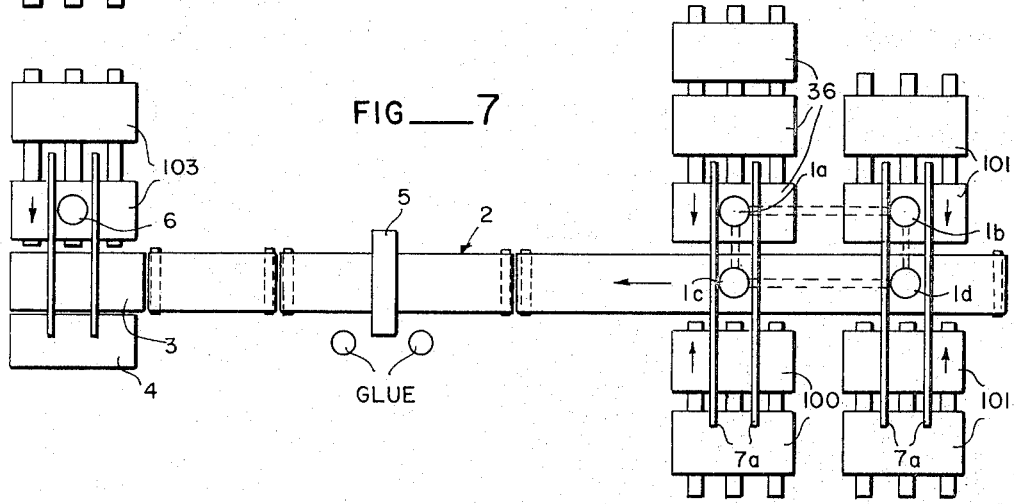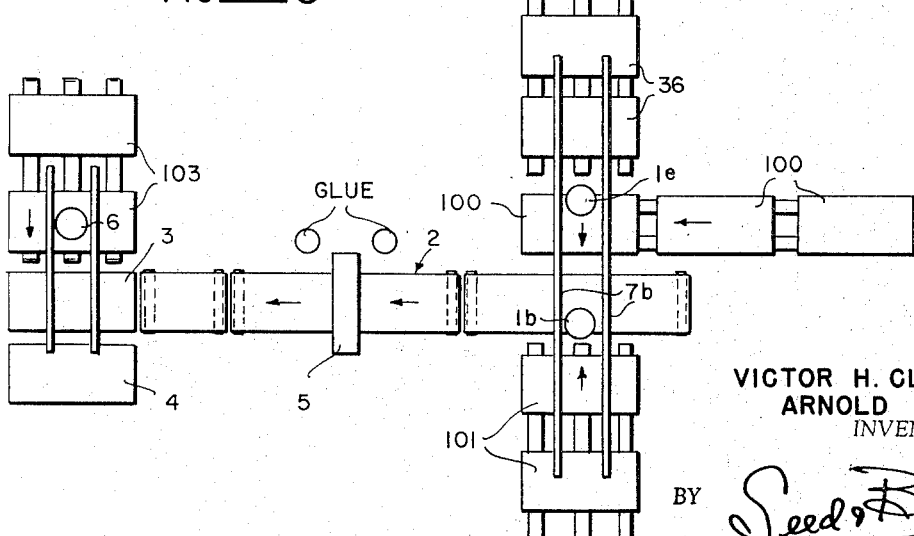

United States Patent Office 3,367,823
Patented Feb. 6, 1968

3,367,823
AUTOMATIC PLYWOOD LAYUP APPARATUS
AND METHOD
Victor H. Clausen, Bellevue, and Arnold Zweig, Olympia, Wash., assignors to Simpson Timber Company, Seattle, Wash., a corporation of Washington
Filed Aug. 5, 1963, Ser. No. 300,033
13 Claims. (Cl. 156—281)

The present invention relates generally to a method and an apparatus for automatically laying up or assembling plywood panels from individual veneers. The present invention more specifically relates to a method and an apparatus wherein individual veneers, in the form of faces, backs, and inner ply layers are received as individual sheets and are fed selectively, in proper sequence, through a glue applicator. After the veneers have been coated with glue or adhesives they may be assembled into panel units and fed into an automatic press loader or may be fed to a pre-press operation or storage location as desired. The present invention is suitable also for preparation of coated veneers which may be later used for purposes other than plywood panels.

The method of the present invention more specifically includes a series of steps beginning with providing a continuous supply of veneers classified and segregated into backs, centers, cross-bands and faces. The veneers comprising centers and cross-bands and all veneers other than back or face veneers will be referred to broadly in the present specification as "inner plys" or "inner ply layers." According to the present method, the veneers are supplied in nominal panel size and units of faces, cross-bands, centers, backs, etc. For example, cross-bands for 4 x 8 panels would be supplied in units of 50 x 100 inch sheets of edge spliced panel-sized veneers. The veneers are selected individually in proper sequence and delivered to a conveyor which carries the veneers through an adhesive applicator and from thence to a veneer transfer and panel assembly unit. Face veneers are similarly selected and fed without passing through the adhesive applicator. Once the veneers are coated with adhesive and assembled in the proper sequence, the assembled panels are conveyed and fed into an automatic press loader or to a pre-press operation or storage, as is well known in the art.

In some instances it may be desirable to work with pre-coated face veneers having a pre-applied coat of adhesive on their back sides. In this case, the back veneer or last inner ply would be placed on top of the assembled veeners without coating and the coated face veneer then laid on.

With even the most modern methods and machinery known to the plywood industry, the essential task of laying-up plywood panels from individually selected veneers, preparatory to feeding the panels into an automatic press loader, pre-press operation or storage, can only be accomplished by means of manual handling, with the labor cost of the laying-up process being a major factor in the cost of the final product. In addition, manual handling of the individual veneers is a time-consuming and inexact operation resulting also in actual material losses in the form of veneer waste and glue waste. Although many attempts have been made in the prior art to devise suitable methods and apparatus for performing the laying-up of plywood panels by automatic means, no acceptable system has yet been devised. The unsolved problems existing in the prior art include the handling of rough and uneven sheets of veneers as they issue from the peeler and dryer in such a manner as to avoid waste and foul-up of machinery. Problems exist also in the nature of the complexities of applying a coat of adhesive to the veneers and then transferring and stacking the veneers in a proper sequence all in a continuous flowing process.

The present invention has, therefore, the primary object of providing a method and an apparatus for automatically selecting individual veneers in proper sequence, applying a suitable adhesive coating to certain of the veneers and assembling or laying-up the veneers to form pre-assembled panel units to be fed to an automatic press loader, pre-press operation or storage, in a continuous operation.

Another object of the present invention is to provide an apparatus for picking up and transferring individual veneers in the proper timed sequence for delivery to a continuously moving conveyor means for further handling.

Another object of the present invention is to provide an apparatus for picking up and transferring individual veneers in the proper timed sequence for delivery to a continuously moving conveyor wherein a vacuum source is utilized as a means for grasping and holding the veneers during pick-up and transfer.

Another object of the present invention is to provide an apparatus for applying an even coating of adhesive to a series of moving veneers without affecting the speed of the moving veneers and with no appreciable loss of adhesive material.

Another object of the present invention is to provide an apparatus for applying an even coating of adhesive to a series of moving veneers by means of passing the veneers at a constant speed through an uninterrupted curtain of liquid adhesive, thereby permitting the constant feed of the overall operation.

Another object of the present invention is to provide an apparatus for receiving a constant flow of adhesively coated veneers and transferring the veneers to a stacking device without interruption, and without contact being made between the individual veneers.

Another object of the present invention is to provide an apparatus for receiving a constant flow of adhesively coated veneers and forming a stack in the proper sequence without interface sliding of the coated surfaces of the veneers.

Another object of the present invention is to provide an apparatus for stacking veneers by laying one on top of another by means of vertically dropping the succeeding veneers to avoid sliding contact between adhesively coated surfaces of the veneers.

Another object of the present invention is to provide an apparatus for forming a stack of veneers to make up individual pre-formed panel units having at least one edge and one end of the individual veneers in substantial alignment to aid in simplifying subsequent trimming operations.

Another object of the present invention is to provide a novel method of laying-up plywood panels whereby pre-cut unitary faces, centers, cross-bands and backs are supplied in the proper sequence to a moving conveyor and subsequently coated and stacked to form panel units.

Yet another object of the present invention is to provide a novel method of laying-up plywood panels whereby sequentially fed veneers are passed through an uninterrupted curtain of liquid adhesive and subsequently formed into panel units.

A further object of the present invention is to provide a novel method of laying-up plywood panels whereby sequentially fed adhesively coated veneers are transferred from a moving stream to an individually supported position and then individually dropped vertically to form panel units.

A further object of the present invention is to provide a novel method of laying-up plywood panels whereby individual veneers are selectively coated with adhesive and formed into a stack comprising a panel unit with the individual veneers having at least one edge and one end thereof in substantial alignment.

A still further object of the present invention is to provide an apparatus comprising a combination of means for automatically selecting veneers, transferring the veneers to a moving conveyor, adhesively coating selected veneers and assembling or laying-up the veneers to form panel units, with at least one edge and one end of the individual veneers being in substantial alignment.

The means by which the foregoing objects are accomplished are set forth in the following specification and illustrated in the accompanying drawings, in which:

FIG. 1 is a schematic view of the preferred layout of the present invention showing the various components of the apparatus in plan view.

FIG. 2 is a detailed schematic plan view of the vacuum pick-up portion of the invention.

FIG. 3 is a detailed schematic plan view of the veneer transfer and stacker portion of the invention.

FIG. 4 is an elevational view of a portion of the present device taken along lines 4—4 of FIG. 3 and comprising a detailed schematic illustration of the transfer and stacker units.

FIG. 5 is an elevational view of a portion of the apparatus taken along lines 5—5 of FIG. 2 and comprising a detailed schematic illustration of the vacuum pick-up portion of the present invention.

FIG. 6 is a schematic illustration in plan view of the preferred arrangement of the units of the present device.

FIG. 7 is a schematic illustration in plan view of an alternative arrangement of the various units of the present invention.

FIG. 8 is a schematic illustration in plan view of another modification of the arrangement of the various units of the present invention.

Referring now to the drawings, wherein like reference numerals indicate identical parts, the preferred embodiment of the present invention will be explained with the understanding that only the essential structural elements have been shown in the drawings for ease of illustration because of the complexity of the overall device. Those skilled in the art of plywood manufacture will readily appreciate that various alternative structural elements may be utilized in certain instances and that only those structural elements which are essential for an understanding of the present invention are shown by way of illustration in the drawings.

FIG. 1 represents the general overall layout of the components of the preferred embodiment of the present invention, which comprises broadly a vacuum pick-up and transfer unit indicated generally by the numeral 1, a variable speed belt conveyor unit 2, a terminal transfer unit 3, a veneer stacker unit 4 and a curtain coater apparatus 5. A second vacuum pick-up and transfer unit for supplying uncoated face veneers is indicated generally by the numeral 6 with the position of the pick-up device being indicated by the dotted line portion. It will be understood that the details of the vacuum pick-up unit 6 are substantially identical to the vacuum pick-up and transfer unit 1, with the details of the unit 6 being omitted from the drawings to permit illustration of the units 3 and 4.

To aid in the understanding of the present invention, the structure of each of the aforementioned components will be described in detail prior to the explanation of the overall coordinated operation of the set-up. Referring now to FIGS. 2 and 5, the vacuum pick-up and transfer unit 1 comprises a stationary frame which will include the parallel track members 7 and a suitable cross beam 8. The members 7 and 8 may be supported by any suitable framing structure, not shown, which normally rests on a floor surface so as to support the members 7 a suitable distance above the conveyor 2 with the tracks 7 running transversely to the longitudinal axis of the conveyor.

As shown in FIG. 5, the tracks 7 may comprise conventional C-shaped channel irons which provide an internal trackway and guide for the wheels 9 of a movable carriage 10. With the arrangement shown, the carriage 10 is free to move on its wheels or rollers 9 between the position illustrated in FIG. 2 and an unloading position above the conveyor 2. The carriage 10 is selectively moved along the tracks 7 by means of double-acting air cylinder 11 having its piston rod 12 connected to the carriage 10. The cylinder 11 may be conveniently fixed to the cross-beam 8 and it will be understood that the stroke of the piston rod will be sufficient to move the carriage from the position shown to one above the conveyor 2.

Rotatable shafts 13 extend between the side members of the carriage 10 adjacent the ends of the carriage and provide a mounting for sprockets 14 which are fixed thereto, with a sprocket 14 being located at each corner of the carriage 10. In the preferred embodiment, a link chain 15 is attached at a point on the periphery of each of the sprockets 14 and passes upwardly around the sprocket and then downwardly with the opposite end of each of the chains 15 being connected to a vacuum head 16 illustrated in FIG. 5. For a purpose to be presently explained, the chains 15 will all pass over their respective sprockets 14 in a common direction. Thus the chains 15 will all pass over either the left or the right side of the sprockets 14 as viewed in plan in FIG. 2.

The vacuum head 16 may be of any configuration and in the preferred embodiment, the vacuum 16 comprises a rectangular frame, the corners of which are connected to the downwardly extending chains 15. The top side of the vacuum head, as viewed in FIG. 5 will be understood to be closed except for connection to a vacuum conduit 17 which is connected to a suitable vacuum source. The bottom face of the vacuum head 16 may be provided with a perforated plate, a plate of porous material or, in the event that smooth plane surface veneers, panels or other sheet materials are to be handled, the bottom face of the vacuum head 16 may remain open.

A small air cylinder 18 is carried by the carriage 10 and attached to the carriage by the bracket 19. The air cylinder 18 is of the double-acting type having a single piston and two piston rods 18'. The piston rods 19 are connected to the ends of a chain 20 which is trained about suitable sprockets 21, fixed to the rotatable shafts 13. As the piston member and the piston rods 18' are moved in either direction, the chain 20 causes the shafts 13 to rotate in the same direction by means of the sprockets 21, in a well-known manner. Since the chains 15 pass over the sprockets 14 in a common direction, and are attached to the vacuum head, the vacuum head will be caused to reciprocate in a vertical direction as indicated by the arrow in FIG. 5. The vacuum head may be selectively controlled by means of the air cylinder 18 to lower and pick up a veneer, move the veneer to a raised position and hold it until the entire carriage is moved to a position above the conveyor 2. Suitable hollow guides 22 may be fixed to the carriage 10 so as to receive upright guide bars 23 carried by the vacuum head, for guiding the head as illustrated in FIGS. 2 and 5.

As illustrated most clearly in FIG. 5, the bottom end of the vacuum conduit 17 will include a flexible portion 24 which connects to the vacuum head 16 so as to accommodate the vertical movement of the vacuum head. The main portion of the vacuum conduit 17 is rigidly fixed to the carriage 10 by means of a bracket 17' so that the conduit follows the motion of the carriage as it reciprocates on the tracks 7. The vacuum conduit 17 also includes a vent opening 25 for opening the vacuum head 16 to atmospheric pressure when it is desired to release a veneer that has been picked up from a stack. The vent 25 is provided with a butterfly valve disc 26 and a similar butterfly valve disc 27 is located in the conduit 17 above the vent 25. The butterfly valve 27 is mounted on a rotatable shaft 28 and the butterfly valve 26 is mounted on a similar rotatable shaft 29. The shaft 28 carries a sheave or pulley 30 and the shaft 29 carries a similar sheave 31. A suitable cable or the like 32 is trained about the sheaves 31 and 30 so that the shafts 28 and 29 will rotate simultaneously. The butterfly valves 26 and 27 are so positioned on their respective shafts that the valve 26 is in the closed position when the valve 27 is opened and vice versa. A double-acting air cylinder 33 is pivotally mounted to the carriage 10 and includes a piston rod 34 which is connected to rotate the shaft 28 by means of a rock arm 35 in a well-known manner.

When the shaft 28 is positioned to hold the valve 27 in an open position, the shaft 29 is rotated to close the valve 26 so as to place the vacuum head 16 under vacuum for picking up a veneer. After the veneer has been raised and transferred to a position above the belt 2, the air cylinder 33 is operated to rotate the shaft 28 to place the valve 27 in a closed position. At the same time, the valve 26 opens to vent the vacuum head 16 and to thus release the veneer which falls to the conveyor belt 2.

The stack of raw veneers to be supplied to the vacuum pick-up and transfer device is conveniently located beneath the vacuum head 16 as illustrated in FIG. 5 with the stack of veneers 36 being supported by an incremental lift table 37 which may be of any construction well-known in the art. Merely by way of illustration, the incremental lift table 27 or elevator table may be controlled by a limit switch 38, having a switch arm 39 for contacting a dog 23' on one of the guide bars 23 when the guide bar reaches a predetermined lower limit of travel. Thus when the head 16 has to travel so low that the dog 23' engages the switch arm, a signal is originated to raise the lift table. The details of the structure of the lift table 37 form no part of the present invention and it is necessary only to point out that the incremental lift will be operated to raise the level of the table 37 and the stack 36 a small increment such as ¼ inch, depending on the type of veneers being handled, upon the closing of an electrical circuit by means of a limit switch 38. In this manner, the level of the top of the stack 36 is maintained within a predetermined range as the veneers are removed. In the alternative, a simple weight-responsive spring-actuated table, similarly well-known in the prior art, can be used to maintain the stack of veneers at the desired level as the veneers are removed. It is also desirable to keep a constant supply of veneers at the pick-up station, which function is to be accomplished by any one of a multitude of known conveyor systems.

The conveyor 2 of the preferred embodiment is made up of a plurality of individual conveyor belts 40 supported in any desirable manner beneath the tracks 7, and extending between the vacuum pickup and transfer unit 1 and the terminal transfer unit 3. The belts 40 of the conveyor are preferably spaced so as to allow any loose material, which may break off from the veneers, to fall to the floor. The belts 40 of the conveyor will be driven by suitable power shafts 41 and sprockets 42 placed in the conventional manner. It is also desirable to drive the conveyor 2 from a variable power source which may be regulated to drive the conveyor at the proper speed to control the spread-weight of adhesive applied to the veneers as desired. It will be well understood by those versed in the art that the conveyor 2 may be modified or broken up into sections as a matter of choice or design, without changing the character of the present invention.

A conventional curtain coater 5, indicated in block form in FIG. 1, will be located at a desirable point along the length of a conveyor 2 to provide a means for depositing an even coat of liquid adhesive to the veneers as they pass along the conveyor to the terminal transfer unit 3. The details of the construction and arrangement of the curtain coater form no part of the present invention, and the curtain coater comprises a commercially available coating unit which may be mounted in position according to engineering requirements. Although the curtain coater apparatus has been mentioned specifically by way of example, it will be well understood that other types of adhesive coating apparatus may be utilized in conjunction with the present invention, such as roll coaters or spray systems.

Referring now to FIGS. 3 and 4 in particular, the details of the terminal transfer unit 3, veneer stacker 4 and the vacuum pick-up unit 6 for the face veneers will be described. The supporting frame for the transfer unit 3 may comprise an upper cross-beam 43, side rails 44 and 45, shown in FIG. 3 and a rear cross-beam 46. Certain of the structural frame members shown in FIG. 3 have been eliminated in FIG. 4 for ease of illustration. An intermediate cross-beam 47 and a fourth cross-beam 48 also extend between the side rails 44 and 45. Suitable uprights 49, 50 and 51 serve to support the cross-beams 43, 47 and 46, respectively, as illustrated in FIG. 4. It will be understood that the stationary supporting structure described may be varied as desired without departing from the spirit of the invention as long as the functions to be attributed to these elements are performed.

The cross-beams 47 and 48 provide a suitable mounting for a stationary table composed of individual spaced cross-planks 52, 53, 54, 55, 56, 57 and 58. The composite table is positioned at a level to receive the veneers as they issue from the conveyor 2, with the side rail 44 providing a back-stop for the veneers.

A plurality of stationary guide bars 59 are fixed at right angles to the cross-beam 48, as shown in FIG. 3, and are inclined downwardly away from the beam 48 to provide an inclined guide for the movement of the veneers in a manner presently to be described. Each of the guide bars 59 terminates in a downwardly directed end portion 60 as illustrated in FIG. 4.

Extended guide rails 61, 62 and 63 are supported by the cross-beams 43 and 47 and positioned transversely to the conveyor 2 and above the table planks. Each of the guide rails is provided with a notch or channel 64 for the purpose of mounting a slidable rack 65. The racks 65 are equipped with suitable gear teeth and are rigidly connected to a movable cross head 66. The teeth of the racks 65 mesh with rotatable pinions 67 mounted on a stationary shaft 68. The shaft 68 is rotatably supported by any well known means (not shown) and may be powered by any suitable means such as a sheave or drum 69 which may be connected to a power source in a well-known manner. The power means for driving the sheave or drum 59 will be a selectively reversible motor means whereby the pinions 67 may be operated to advance the cross-head 66 to a position adjacent the cross-beam 43 and then return the cross-head 66 to the position shown in FIG. 3. The advanced position of the cross-head 66 is illustrated by the dotted line portions of FIG. 4.

A mounting bar 70, shown in FIG. 3, is attached to the cross head 66 and located beneath the guide rails 61, 62 and 63. The mounting bar 70 carries a plurality of sweep arms 71. The sweep arms are positioned along the mounting bar between each of the table planks 52 through 58. As shown in FIG. 4, the sweep arms 71 extend downwardly from the mounting bar 70 a slight distance below the level of the table provided by the planks. As the cross-head 66 is caused to move toward the cross beam 43, to the dotted line position shown in FIG. 4, the sweep arms operate to remove the veneer from its position on top of the table planks. The plurality of sweep arms 71 are mounted on a common rotatable shaft 72 carried by the mounting bar 70 with suitable spring mechanism, not shown, being provided to rotate the sweep arms 71 in a counter clockwise direction to a horizontal position as opposed to the vertical position shown by the full line illustration of FIG. 4. Any mechanical spring apparatus for accomplishing this purpose is suitable and the details thereof form no part of the present invention. In order to hold the sweep arms 71 in the vertical position shown in FIG. 4, an air motor or air cylinder 73 is mounted on the cross head 66. The motor 73 is suitably connected to the rotatable sweep arm shaft 72 so as to hold the sweep arms 71 in the vertical position against a spring bias, when the air cylinder is energized.

The air cylinder or motor 73 is energized to hold the sweep arms 71 in a constant vertical position against a spring bias while the cross head 66 is in the retracted position adjacent the beam 47. During normal operation, the arms 71 remain vertical as the cross head 66 sweeps to the left as viewed in FIG. 3. The cylinder is then de-energized before the return stroke begins so as to allow the sweep arms 71 to pivot counter-clockwise to the horizontal position to allow the incoming veneer to freely slide across the table planks. As the cross head 66 approaches the return position adjacent the cross beam 47, the air cylinder 73 is again energized to return the sweep arm 71 to the vertical position.

To complete the structure of the terminal transfer unit 3, cantilevered rollers 74 are mounted in conjunction with table planks 55, 56 and 57. Only the roller 74 mounted in conjunction with table plank 56 is illustrated in FIG. 3 and it will be understood that identical rollers are mounted in conjunction with planks 55 and 57, located approximately beneath the guide channels 62 and 63. The rollers 74 are driven by shafts 75 which are journaled in cross beams 46 and 47 as illustrated in FIG. 3. The shafts 75 are fitted with suitable sheaves or pulleys and interconnected by means of driving belts or the like to be driven from a common power source, not shown. The rollers 74 function to contact the veneer issuing from the conveyor 2 and insure that the veneer passes completely into the terminal transfer unit to contact the back stop provided by the side wall 44. The ends of the veneer are thus aligned before being stacked for the purpose of assisting in subsequent trimming operations.

The veneer stacker unit 4 of the present invention comprises a composite drop table or platform made up of the two shiftable plates 76 and 77 and a jogger unit indicated generally at 78. The shiftable plate 76 is made up of a plurality of horizontally extending fingers 79, illustrated in FIG. 3, which extend from a connecting portion 80 which is in turn securely fixed to a slidable cross arm 81 as illustrated in FIG. 4. The shiftable plate 76 is preferably formed from a flat plate of lightweight, high strength metal such as magnesium alloy or the like, so as to decrease the inertia effect when the plate is rapidly shifted to drop individual veneers. The cross arm 81 is free to slide along suitable support beams 82 which engage its end portions. It will be understood that any suitable guide means for guiding the movement of the cross arm 81 may be provided as desired. The air cylinder 83 has its piston rod 84 connected directly to the cross arm 81 in such a manner as to allow the cylinder 83 to reciprocate the cross arm in both directions as indicated by the arrow in FIG. 4. It will also be noted that the downwardly extending end portions 60 of the guide bars 59 extend between the fingers 79 of the drop plate 76.

The plate 77 is similar in structure to the plate 76 and includes the fingers 85 which, when the two drop plates are in the position shown in FIG. 4, align with the fingers 79 to form a substantially continuous surface. It will be noted, however, that the drop plate 77 is preferably offset downwardly a short distance from the plate 76 for the purpose of preventing the veneers from hanging up as they slide onto the drop table. The relative positions of the drop plates 76 and 77 are shown in FIG. 4 with the off-set between the plates being clearly shown. Although the off-set is shown as exaggerated in FIG. 4, it is desirable to have only a minimum of off-set between the planes of the plates so as to present a substantially flat level surface upon which the veneers rest. The plate 77 is reciprocated in the same fashion as described for the plate 76 with a cross-arm 86 being slidable along a support beam 87 in the same manner as described for the cross-arm 81 and the support beams 82. The air cylinder 88 provides the necessary power to reciprocate the plate 77 in both directions as indicated by the arrow in FIG. 4.

A movable dolly or platform 89 will be located directly beneath the surface provided by the shiftable plates 76 and 77 for the purpose of providing a platform upon which to stack the veneers as they are dropped from the drop table. The dolly 89 is illustrated merely as an example and it will be understood by those versed in the art that many different forms of support may be provided for the veneers beneath the drop table, such as a belt conveyor which may be indexed to progressively remove the stacked veneers to an automatic press loader, pre-press operation or storage. It is preferable, of course, to have the veneers stacked on a suitable support for direct feeding to the press loader without further handling. In the event, however, that prepressed plywood panels are being handled by the stacker or in the event that individual or multiple veneers are being handled for purposes other than plywood lay-up, such may be conveyed out from under the drop table individually or in units for one of many different dispositions, as desired. The details of construction of such movable support or conveyor have no bearing upon the present invention and are considered to be a matter of design and engineering skill.

The support structure for mounting the jogger 78 and the shiftable plate 77 may be of any conventional design including cross beams 90, longitudinal framing 90' and vertical supports 91. A stop surface is provided for the veneers as they are swept on to drop plates 76 and 77 by a plurality of vertically extending pusher bars 92 located between the fingers 85 of the plate 77. The bars 92 extend a short distance below the level of the plate 77 and are rigidly fixed to a movable connecting bar 93 which is connected to the piston rod 95 of a suitable air cylinder 97. The cylinder 97 is rigid with the support framing as shown and any suitable guide means may be provided for the bar 93.

Since one of the objects of the invention is to form preassembled panel units having one side and one end of the veneers thereof in substantial alignment, each veneer is shifted on the drop table so as to have one side edge against the downwardly extending portions 60 of the guide bars 59 before it is dropped vertically to the stack beneath. For this purpose, the jogger 78, comprising the air cylinder 97 and the pusher bars 92, which pass freely between adjacent fingers 85, functions to move each veneer dropped. The pusher bars 92 are reciprocated in the direction of the arrows in FIG. 4 by means of the double acting air cylinder 97 fixed to the supporting structure. In the embodiment illustrated all of the pusher bars 92 are connected to a common air cylinder to be moved in unison but it would also be possible to move each pusher bar individually by separate air cylinders. It will be necessary, however, to provide a yieldable connection between each pusher bar 92 and the connecting bar 93 as illustrated by the telescoping arrangement between the connecting rods 96 and the bar 93. The object of the yieldable connection between the pusher bars 92 and the bar 93 is to permit the pusher bars to accommodate varying widths of veneers as well as the irregular edges of the veneers so as to prevent buckling as the veneers are pushed against the portions 60 of the members 59. It will be understood that very small force is needed to slide the light weight veneers of the table and hence the spring connection between the pusher bars 92 and the connecting bar 93 will necessarily be a weak one. The details of the spring connection may be varied for any given set-up and hence the details are not illustrated. The pusher bars 92 are illustrated in an unactuated position in FIG. 4 with the pusher bars being movable toward the portions 60 of the members 59.

For the purposes of providing a signal to initiate the operation of the terminal transfer unit 3, a limit switch 98 having a switch arm 99 may be mounted adjacent the rail 44. The incoming veneer will be used to contact the switch arm 99 for providing a signal in a manner presently to be described.

To complete the structure of the overall setup, a vacuum pick-up and transfer 6 may be conveniently located above the support framing for the jogger and the plate 77 as illustrated in FIG. 3. The vacuum pick-up and transfer unit 6 will be utilized to pick up a face veneer and transfer the same to the drop table in proper sequence to complete the individual panel units. The face veneers may be picked up and transferred at different alternative positions as will be explained later, as long as the pick-up and transfer point is beyond the curtain coater, since the face veneer requires no adhesive. Since the details of the structure of the pick-up transfer unit 6 are identical to that described for the vacuum pick-up and transfer unit 1, shown in FIGS. 2 and 5, the details are not repeated in FIG. 4 because of difficulty of illustration.

*Operation*

Although the details of structure involved in the present invention have been described with relation to only one vacuum pick-up and transfer unit, such as unit 1, and a vacuum pick-up and transfer unit 6 suitable for picking up face veneers, it will be understood that a full complement of pick-up and transfer units required for the lay-up of three-ply, five-ply and seven-ply panels will require multiple pick-up stations to complete the overall operation. The placement or arrangement of the various pick-up stations and alternative forms thereof will be explained later on in this description. For the present, it is only necessary to understand the operation of the devices shown by way of example in FIGS. 1 through 5.

In describing the sequence of operation of the various units of the device shown in the drawings, the full cycle involved in the pick-up, transfer, coating and stacking of a single veneer will be referred to. It will also be understood that, while no electric circuitry, connecting conduits for the various air cylinders, or programming system has been illustrated, it is anticipated that well-known timed cycling circuit and programming systems may be adapted to carry out the sequence of operations to be described. It is only necessary to describe and understand the sequence of operation of the various switches, motor means and power shafts to completely comprehend the essence of the present invention.

At the beginning of the cycle for the handling of a given veneer, the transfer carriage 10 will be located in the position shown in FIG. 2 directly above the stack of veneers 36 illustrated in FIG. 5. The lift table 37 will have been raised to place the top veneer on the stack 36 in the proper position to be contacted by the vacuum head 16. The air cylinder 33 will then be actuated to open the butterfly valve disc 27 in the vacuum conduit 17 and, at the same time, close the butterfly disc 26 so that a vacuum is introduced to the vacuum head 16.

With the vacuum head 16 being thus conditioned for operation, the double acting air cylinder 18 is energized to move the chain 20 and the sprockets 21 to rotate the shafts 13 in the same direction. With the sprockets 14 being rotated, the chains 15 are let out to allow the vacuum head 16 to drop into contact with the top veneer on the stack 36. At this point, the air cylinder 18 is reversed to rotate the shafts 13 in the opposite direction. The chains 15 and the vacuum head, along with the top veneer from the stack, are raised to position ready for transfer of the carriage 10. When the vacuum head 16 reaches its upper limit, the air cylinder 18 will be de-energized and conditioned to hold the vacuum head suspended. If desired, one of the guide bars 23 of the vacuum head may be utilized to contact a limit switch arm 39 on the carriage in a predetermined lower position. The switch 38 may be used for the purpose of controlling the elevator table 37 to raise the stack a given increment so as to make the next top veneer available for pick-up.

With the veneer being suspended and held by vacuum to the head 16, the air cylinder 11 is next energized to retract the piston rod 12 thus moving the entire carriage 10 along the tracks 7 to a position atop the moving conveyor 2. When the carriage is in proper position above the conveyor, the air cylinder 11 is de-energized to hold the carriage in position. At this point, the air cylinder 33 is again energized to move the butterfly 27 to the closed position and to open the butterfly 26, thereby venting the vacuum head 16 to atmosphere allowing the veneer to drop vertically to the moving conveyor. The air cylinder 11 is then energized to return the carriage 10 to the position shown in FIG. 2 ready to repeat the pick-up cycle described in the next veneer on the stack 36.

It will be understood that the particular veneer which has been picked up and transferred to the conveyor 2 is either a center veneer, core veneer, cross band veneer, other inner plys, back veneer, or face veneer one side of which is to be coated with liquid adhesive. The veneer is carried by the conveyor 2 through the curtain of liquid adhesive provided by the curtain coater 5 and is thus coated in preparation for stacking. The conveyor delivers the individual veneer to the table provided by the planks 52 through 58 with the rollers 74 insuring that the veneer is moved to its limit position against the backstop provided by the side rail 44 of the unit 3. The moving veneer is used to contact the switch arm 99 of the limit switch 98 which provides a signal for the operation of the terminal transfer unit 3. At the time of delivery of a veneer, the cross head 66 is positioned adjacent the cross beam 47, to one side of the table with the air cylinder 73 being conditioned to maintain the sweep arms 71 in the vertical position as illustrated in FIG. 4.

As soon as the veneer operates the limit switch 98, a reversible motor means, not shown, will be energized to rotate the stationary shaft 68 and the pinions 67 in the clockwise direction as seen in FIG. 4. The rotation of the pinions 67 moves the rack 65 to the left in FIG. 4, thus translating the cross head 66 and sweep arms 77 to the dotted line position shown in FIG. 4. This action moves the coated veneer to the left in FIG. 4 and the veneer slides down the incline provided by the guide bars 59 and on to the shiftable plates 76 and 77.

As the cross head 66 reaches the left hand limit position shown in FIG. 4 the air cylinder 73 is conditioned to release the sweep arms 71 to allow them to pivot counterclockwise by spring action, as illustrated by the arrow in FIG. 4. The sweep arms move to a substantially horizontal position during return of the cross head 66.

Upon reaching the left hand limit position of the cross head 66, the reversible drive means for the pinions 67 reverse direction to rotate the pinion 67 in the counterclockwise direction to return the cross head to the full line position shown in FIG. 4. As the cross head nears its right hand position, the air cylinder 73 is again conditioned to return the sweep arm 71 to the vertical position illustrated. The transfer unit 3 is now ready for reception of the next veneer as it issues from the conveyor.

As soon as the veneer is in position on the plates 76 and 77, the jogger pusher bars 92 are advanced by means of the cylinder 97 to insure that one edge of the veneer is moved into contact with the aligned portions 60 of the guide bars 59 before the veneer is dropped. As mentioned above, the pusher bars 92 of the jogger are yieldable under light spring tension to accommodate the various widths and irregularities in the veneer. It is also to be understood that the jogger mechanism is advanced and retracted once for each individual veneer.

After the veneer has been aligned to the drop table, the drop plates 76 and 77 are simultaneously quickly retracted by the air cylinders 83 and 88 respectively to allow the veneer to drop vertically to the stack supported by the movable support means 89 without disturbing the adhesive coating on the face of the veneer. It will also be understood that, in the cycle involving the transfer and stacking of inner-ply veneers a back veneer or face veneer has been previously deposited and has its upper surface coated with adhesive as described.

The pick-up and transfer unit 6 for face veneers will be controlled by a timed cycle control means or programming unit so as to pick-up and deposit an uncoated face veneer on the drop table in proper sequence to complete the individual panel stack whether it be 3-ply, 5-ply etc.

The movable support 89, or in the alternative any suitable conveyor device, may be controlled by a suitable sensing means such as photo electric cells or even a simple weight responsive mechanism. The support will receive a predetermined number of panel units before moving the stack of panel units to an automatic press feeder, for example, and moving an empty support into position. The details of such an arrangement form no part of the present invention and hence are not described.

*Full component layout*

As mentioned above, the device thus far described and illustrated deals with the handling of a single stack of center veneers and a complete system for handling a complete set of veneers including faces, centers, cross bands, other inner-plys and backs will be referred to as a full component layout. FIGS. 6, 7 and 8 illustrate several alternative full component layouts possible with the present invention. FIG. 6 illustrates the preferred layout and corresponds to the layout of the detaled device described with relation to FIGS. 1 through 5. The components illustrated in FIG. 6 will be identified by the same reference numerals utilized in FIGS. 1 through 5 to identify the components generally.

In FIG. 6, the stacks of veneers representing back veneers, centers and cross bands are all located on one side of the conveyor 2 with individual vacuum pick-up and transfer units 1 being utilized for each different set of stacks. Individual sets of tracks 7 are utilized for moving the vacuum heads shown. The stacks 36, corresponding to the stack shown in FIG. 5, represent back veneers and the stacks 100 and 101 represent stacks of center veneers and cross band veneers respectively. As also illustrated in FIG. 6, the successive stacks of veneers may be continuously fed beneath the vacuum pick-up units by means of conveyor devices represented by the numeral 102. The conveyors 102 may be identical in structure and may comprise individual belts or chains as illustrated or any other desired type of conveyor.

As illustrated in FIG. 6, the vacuum pick-up and transfer unit 6, for the face veneer stack 103, is located on the same side of the conveyor as the vacuum pick-up units 1 and is positioned above the jogger unit 78, adjacent the lay-up station which comprises the veneer stacker mechanism indicated generally by the numeral 4 in FIG. 1. As indicated by the dotted line blocks in FIG. 6, the stacks of face veneers may be located on either or both sides of the conveyor 2 at a position between the curtain coater 5 and the terminal transfer unit 3. When the face veneer stacks are located adjacent the conveyor 2 as illustrated by the dotted line portions of FIG. 6, the vacuum pick-up and transfer unit 6 will operate to deposit the face veneers onto the moving conveyor 2, to be delivered to the terminal transfer unit 3 and then to the stacker unit 4.

The alternate arrangement illustrated in FIG. 7 shows an arrangement wherein the center stacks 100 and the stacks of back veneers 36 are located on opposite sides of the conveyor 2 adjacent the stacks of cross bands 101.

In this arrangement, the vacuum pick-up and transfer units 1a, 1b, 1c and 1d will be connected to move together as a unit on the tracks 7a.

With the arrangement shown in FIG. 7, the multiple vacuum head unit shuttles back and forth from one side of the conveyor to the other. When the vacuum heads 1a and 1b are operating to pick-up from the stacks 36 and 101 on one side of the conveyor, the vacuum heads 1c and 1d are depositing a center veneer and a cross band veneer in sequence, previously picked up from the center stacks 100 and the cross band stacks 101 on the opposite side of the conveyor. In like manner, when the vacuum heads 1c and 1d move to pick up from the center stacks 100 and the cross band stacks 101, the vacuum heads 1a and 1b are in position to drop a back veneer and a cross band veneer previously picked up from the stacks 36 and the stacks 101 on the opposite side of the conveyor. It will be understood that with this arrangement, it becomes necessary to time the dropping operation of the vacuum heads 1a and 1b and the vacuum heads 1c and 1d so as to space the veneers the proper distance on the conveyor 2.

FIG. 7 also illustrates an alternate placing of the vacuum pick-up and transfer unit 6, wherein the face veneer stacks 103 are located on the opposite side of the conveyor and terminal transfer unit 3, from that shown in FIG. 6.

In FIG. 8, yet another alternative arrangement of the placing of the vacuum pick-up and transfer units and the placement of the veneer stacks is illustrated. In this arrangement, the cross band stacks 101 are located on one side of the conveyor 2 and the back veneer stacks 36 are located on the opposite side of the conveyor and fed transversely to the axis of the conveyor. The stacks of center veneers 100 are also located on the opposite side of the conveyor from the stacks 101 but are fed in a direction parallel to the movement of the conveyor 2 and at right angles to the feed of the back veneers 36. In this embodiment, the tracks 7b extend completely across the conveyor and above the stacks 101, the stacks 36 and the end stack 100 of the center veneers. Two individual vacuum pick-up units 1e and 1f are mounted on the tracks 7b and are individually operated. The vacuum pick-up and transfer unit 1e is utilized to alternately pick up back veneers from the stack 36 and center veneers from the end stack 100 beneath the track 7b. The vacuum pick-up and transfer units 1e and 1f may then be operated to sequentially deposit backs, centers and cross bands onto the conveyor 2 with the vacuum pick-up 1f being in the dropping position above the conveyor when the vacuum pick-up unit 1e is in the pick up position either above the stack 100 or the stack 36. It will also be realized that this embodiment of the invention requires additional timing control to deposit the various veneers in the proper timed sequence on the moving conveyor 2.

Although the preferred embodiment of FIGS. 1–6 and the alternative embodiments of FIGS. 7 and 8 have been described with a plurality of pick-up stations for the various veneers, it will be well understood that the present invention may be utilized in a set-up using only one pick-up station. Under such an arrangement the veneers would have to be stacked in the proper sequence in one stack beneath a vacuum pick-up head. The sequence would include a back veneer and the necessary inner plys in the correct order which would then be coated and deposited in the same order by the stacker unit 4 ready for pressing or storage.

It will be realized by those skilled in the art of plywood lay-up that the present invention provides tremendous advances over known lay-up devices and manual lay-up methods now being used in the commercial production of plywood panels. It has been experienced that efficient transfer and stacking of individual veneers may be carried out with the present device with the conveyor 2 moving the veneers at a rate of from 200 to 400 feet per minute between the initial vacuum pick-up and transfer units 1 and the terminal transfer units 3. With the conveyor 2 moving at a rate of speed within the stated range, the veneers may be deposited upon the conveyor with a minimum spacing of approximately 4 feet between veneers at the pick-up stations. As the veneers reach the terminal transfer unit 3, the spacing between the veneer in place in the transfer unit 3 and the next succeeding veneer in place on the conveyor reduces from approximately 4 feet to approximately 1 foot without foulup because of the delay due to the operation of the transfer unit 3. With this timing arrangement of the preferred embodiment, sufficient time is allowed also for the retraction and return of the drop plates 76 and 77 and the operation of the vacuum pick-up and transfer unit 6, for placing face veneers in the proper sequence on the drop table.

The present invention makes it possible to nearly double the amount of plywood panels per unit of time as compared with the output of conventional lay-up crew and a single glue spreading device with present manual lay-up methods. With a ⅜″ plywood control basis, it has been possible to increase the output of panels from approximately 5,600 feet per hour to 9,500 feet per hour with the present invention. In addition to the increased output possible, the amount of manual labor required has been greatly reduced producing a marked reduction in the overall cost of plywood panel production. The present device also makes it possible to achieve significant results in the nature of reduced losses of wood material and glue, due to inefficient manual handling. With the use of the present invention, veneer damage attributable to handling is reduced to a minimum and the controlled application of glues or adhesives results in efficiencies hitherto unattainable.

It will therefore be readily understood by those skilled in the art that the present invention presents significant advances over prior art devices in the nature of time, labor, and cost saving operation of plywood lay-up installations. It will also be understood that numerous modifications and alternations to the present device and method may be accomplished without departing from the spirit and scope of the invention. Applicants therefore intend to be limited only to a liberal interpretation of the specifications and claims.

What is claimed as new and desired to be secured by Letters Patent is:

1. Apparatus for automatic continuous lay-up of plywood panels having a given number of plies comprising in combination; conveyor means for continuously moving individual veneer sheets in spaced relation along a given course of travel to a stacking station; means for placing the individual veneer sheets on said conveyor in a prearranged sequence, adhesive coating means positioned along said given course of travel and cooperating with said conveyor means for forming a uniform coating of adhesive on the surface of the upper face only of the veneer sheets as they move toward the stacking station; delivery means for delivering uncoated veneer sheets, one at a time, to said conveyor means between said adhesive coating means and said stacking station, stacking means at the stacking station for automatically dropping the conveyed veneer sheets, one at a time, to form a stack at the stacking station; said delivery means being adapted to deliver uncoated veneer sheets to said conveyor means at preset intervals coordinated with said prearranged sequence such that an uncoated veneer sheet is delivered to said stacking means each time said given number, less one, of coated veneer sheets are dropped, whereby a stack of said panels is automatically formed ready for pressing.

2. The combination according to claim 1 wherein; said adhesive coating means comprises means forming a continuous unbroken curtain of liquid adhesive across said given course of travel through which said veneer sheets are caused to pass.

3. The apparatus according to claim 2 wherein; said conveyor means includes a constantly moving endless conveyor and transfer means to transfer said veneer sheets from the moving conveyor to said stacking means, said delivery means being positioned to deliver said uncoated veneer sheets onto the endless conveyor.

4. The apparatus according to claim 2 wherein; said conveyor means includes a constantly moving endless conveyor and transfer means to transfer said veneer sheets from the moving conveyor to said stacking means, said delivery means being positioned to deliver said uncoated veneer sheets directly to said stacking means.

5. Apparatus for automatic lay-up of plywood panels having a given number of plies comprising in combination; a constantly moving endless conveyor, track means located above said conveyor and extending transversely thereto, movable carriage means mounted on said track means and shiftable between a veneer pick-up position adjacent said conveyor and a veneer depositing position directly above said conveyor, means to move said carriage means between said pick-up and depositing positions to place individual veneer sheets on said conveyor in prearranged sequence, first vertically movable vacuum pick-up means carried by said carriage means, means to raise and lower said first pick-up means for picking up and depositing individual veneer sheets, a terminal transfer unit positioned at the end of said conveyor remote from said first pick-up means to receive individual veneer sheets delivered thereto by said conveyor, said transfer unit including means to move said veneer sheets laterally from said conveyor, stacker means for receiving veneer sheets from said transfer unit and dropping them vertically to form a stack, adhesive coating means positioned along said conveyor between the first pick-up means and the transfer unit for applying a coating of adhesive to the upper face of the moving veneer sheets, and second movable vacuum pick-up means for delivering uncoated veneer sheets, one at a time, at preset intervals coordinated with said prearranged sequence to said stack each time said given number, less one, of coated veneer sheets are dropped, whereby a stack of said panels is automatically formed ready for pressing.

6. The combination according to claim 5 wherein; said adhesive coating means comprises a curtain coater forming a continuous unbroken film of liquid adhesive through which said veneer sheets are carried by said conveyor.

7. The apparatus according to claim 6 wherein; said second vacuum pick-up means is positioned to deliver said uncoated veneer sheets onto said conveyor between the coating means and the transfer unit.

8. The apparatus according to claim 6 wherein; said second vacuum pick-up means is positioned to deliver said uncoated veneer sheets directly to the stacker means.

9. A method for continuous lay-up of plywood panels of a given number of plies comprising; conveying individual veneer sheets in a prearranged sequence in spaced relation to a stacking station, coating the upper face only of said veneer sheets with adhesive while they are moving to the stacking station, dropping said coated veneer sheets one at a time in a stack at the stacking station, and dropping an uncoated veneer sheet onto said stack each time said given number, less one, of coated veneer sheets are piled at the top of the stack to thereby form a stack of said plywood panels ready for pressing.

10. A method for automatic continuous lay-up of plywood panels having a given number of plies comprising; continuously conveying veneer sheets in a prearranged timed sequence in spaced relation to a stacking station, coating the upper face only of said veneer sheets with adhesive while they are moving toward the stacking station, dropping said coated veneer sheets one at a time in a stack at the stacking station, and dropping uncoated veneer sheets onto said stack at preset intervals coordinated with said time sequence such that an uncoated veneer sheet is piled onto the top of the stack each time said given number, less one, of coated veneer sheets are piled at the top of the stack to thereby automatically form a stack of said plywood panels ready for pressing.

11. A method for continuous lay-up of plywood panels of a given number of plies comprising; conveying individual veneer sheets in prearranged sequence in spaced relation along a given travel path to a stacking station, continuously supplying an unbroken curtain of liquid adhesive across said travel path at a coating station to coat the upper face of said veneer sheets with adhesive while they are moving to the stacking station, dropping said coated veneer sheets one at a time to form a stack at the stacking station, and delivering an uncoated veneer sheet onto the top of said stack each time said given number, less one, of coated veneers are piled at the top of the stack to thereby form a stack of said plywood panels ready for pressing.

12. The method according to claim 11 in which said uncoated veneer sheets travel a portion of said travel path between said coating station and said stacking station.

13. The method according to claim 11 in which said veneer sheets are shifted laterally from the end of said travel path, one at a time, at said stacking station and are then dropped onto said stack.

References Cited
UNITED STATES PATENTS

| | | | |
|---|---|---|---|
| 1,870,041 | 8/1932 | Dike | 118—308 X |
| 2,221,367 | 11/1940 | Bishop et al. | 118—324 X |
| 2,274,590 | 2/1942 | Cook | 271—6 X |
| 2,284,563 | 5/1942 | Dillman et al. | 156—562 |
| 2,546,522 | 3/1951 | Quakenbush | 118—236 |
| 2,698,097 | 12/1954 | Magnani | 214—1 |
| 2,914,321 | 11/1959 | Nelson et al. | 271—5 |
| 3,046,008 | 7/1962 | Velvel | 271—68 |
| 3,259,417 | 7/1966 | Chapman | 294—64 |

EARL M. BERGERT, *Primary Examiner.*

M. L. KATZ, *Assistant Examiner.*